(12) United States Patent
Safranek et al.

(10) Patent No.: US 11,061,850 B2
(45) Date of Patent: Jul. 13, 2021

(54) MULTIPLE TRANSACTION DATA FLOW CONTROL UNIT FOR HIGH-SPEED INTERCONNECT

(71) Applicant: Intel Corporation, Santa Clara, CA (US)

(72) Inventors: Robert J. Safranek, Portland, OR (US); Robert G. Blankenship, Tacoma, WA (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 16/708,042

(22) Filed: Dec. 9, 2019

(65) Prior Publication Data

US 2020/0110726 A1    Apr. 9, 2020

Related U.S. Application Data

(63) Continuation of application No. 16/133,120, filed on Sep. 17, 2018, now Pat. No. 10,503,688, which is a
(Continued)

(51) Int. Cl.
*G06F 13/42* (2006.01)
*G06F 13/14* (2006.01)
(Continued)

(52) U.S. Cl.
CPC ...... *G06F 13/4282* (2013.01); *G06F 12/0831* (2013.01); *G06F 13/00* (2013.01);
(Continued)

(58) Field of Classification Search
CPC .......... G06F 13/00; G06F 13/14; G06F 13/38; G06F 13/4234; G06F 13/426;
(Continued)

(56) References Cited

U.S. PATENT DOCUMENTS

| | | | |
|---|---|---|---|
| 7,010,607 B1* | 3/2006 | Bunton | H04L 1/18 709/228 |
| 7,210,000 B2* | 4/2007 | Creta | G06F 13/387 370/356 |

(Continued)

FOREIGN PATENT DOCUMENTS

| | | |
|---|---|---|
| WO | 2006089559 A1 | 8/2006 |
| WO | 2013085501 A1 | 6/2013 |

OTHER PUBLICATIONS

International Preliminary Report on Patentability and Written Opinion for Application No. PCT/US2011/063662, dated Jun. 19, 2014, 5 pages.

(Continued)

*Primary Examiner* — Eric T Oberly
(74) *Attorney, Agent, or Firm* — Alliance IP, LLC

(57) ABSTRACT

Methods, apparatus, and systems, for transporting data units comprising multiple pieces of transaction data over high-speed interconnects. A flow control unit, called a KTI (Keizer Technology Interface) Flit, is implemented in a coherent multi-layer protocol supporting coherent memory transactions. The KTI Flit has a basic format that supports use of configurable fields to implement KTI Flits with specific formats that may be used for corresponding transactions. In one aspect, the KTI Flit may be formatted as multiple slots used to support transfer of multiple respective pieces of transaction data in a single Flit. The KTI Flit can also be configured to support various types of transactions and multiple KTI Flits may be combined into packets to support transfer of data such as cache line transfers.

26 Claims, 13 Drawing Sheets

Related U.S. Application Data continuation of application No. 15/262,415, filed on Sep. 12, 2016, now Pat. No. 10,078,617, which is a continuation of application No. 13/994,128, filed as application No. PCT/US2011/063662 on Dec. 7, 2011, now Pat. No. 9,442,879.

(51) Int. Cl.

| | | |
|---|---|---|
| *G06F 13/38* | (2006.01) | |
| *H04L 12/00* | (2006.01) | |
| *G06F 13/00* | (2006.01) | |
| *G06F 12/0831* | (2016.01) | |
| *G06F 15/78* | (2006.01) | |

(52) U.S. Cl.
CPC .............. *G06F 13/14* (2013.01); *G06F 13/38* (2013.01); *G06F 13/426* (2013.01); *G06F 13/4234* (2013.01); *G06F 15/781* (2013.01); *H04L 12/00* (2013.01); *G06F 2212/621* (2013.01); *G06F 2213/0008* (2013.01); *G06F 2213/0024* (2013.01); *G06F 2213/0026* (2013.01)

(58) Field of Classification Search
CPC ............. G06F 13/4282; G06F 12/0831; G06F 15/781; G06F 2213/0008; G06F 2213/0024; G06F 2213/0026; G06F 2212/621; H04L 12/00

See application file for complete search history.

(56) References Cited

U.S. PATENT DOCUMENTS

| | | | |
|---|---|---|---|
| 8,711,867 | B2 | 4/2014 | Guo et al. |
| 9,442,879 | B2 | 9/2016 | Safranek et al. |
| 2004/0111490 | A1 | 6/2004 | Im et al. |
| 2005/0111490 | A1 | 5/2005 | Gillet |
| 2005/0149656 | A1 | 7/2005 | Seto |
| 2005/0172091 | A1 | 8/2005 | Rotithor et al. |
| 2007/0053350 | A1 | 3/2007 | Spink et al. |
| 2009/0113140 | A1 | 4/2009 | Quach |
| 2013/0085501 | A1 | 4/2013 | Lim et al. |
| 2014/0372658 | A1 | 12/2014 | Safranek et al. |

OTHER PUBLICATIONS

International Search Report and Written Opinon for Application No. PCT/US2011/063662, dated Aug. 29, 2012, 8 pages.

Maddox R., et al., "Weaving High Performance Multiprocessor Fabric," Architectural insights into the Intel.Rtm. QuickPath Interconnect, Intel, Press, Version 1.0, Jul. 2009, 328 pages.

* cited by examiner

Legend

Fig. 14 — x8 Flit Bit Assignment (1400)

Fig. 15 — x12 Flit Bit Assignment (1500)

MULTIPLE TRANSACTION DATA FLOW CONTROL UNIT FOR HIGH-SPEED INTERCONNECT

RELATED APPLICATIONS

The present application is a continuation of U.S. patent application Ser. No. 16/133,120, filed on Sep. 17, 2018, entitled "MULTIPLE TRANSACTION DATAFLOW CONTROL UNIT FOR HIGH-SPEED INTERCONNECT", which is a continuation of U.S. patent application Ser. No. 15/262,415, filed on Sep. 12, 2016, entitled "MULTIPLE TRANSACTION DATAFLOW CONTROL UNIT FOR HIGH-SPEED INTERCONNECT", which is a continuation of U.S. patent application Ser. No. 13/994,128, filed on Aug. 15, 2014, entitled "MULTIPLE TRANSACTION DATA FLOW CONTROL UNIT FOR HIGH-SPEED INTERCONNECT", which is a U.S. National Phase Application under 35 U.S.C. Section 371 of International Application No. PCT/US2011/063662, filed on Dec. 7, 2011, entitled "MULTIPLE TRANSACTION DATA FLOW CONTROL UNIT FOR HIGH-SPEED INTERCONNECT", which is hereby incorporated herein by reference in its entirety and for all purposes.

FIELD OF THE INVENTION

The field of invention relates generally to computer system interconnects and, more specifically but not exclusively relates to techniques for supporting transport of multiple pieces of transaction data via a single flow control unit and related flow control unit configurations and formatting for coherent memory transactions and related messages.

BACKGROUND INFORMATION

Computer systems typically employ one or more interconnects to facilitate communication between system components, such as between processors and memory. Interconnects and/or expansion interfaces may also be used to support built-in and add on devices, such as 10 (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group). As such, PCIe pads are available from many ASIC and silicon vendors.

Recently, Intel introduced the QuickPath Interconnect® (QPI). QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processors or processor cores employing shared memory resources. QPI transactions employ packet-based transfers using a multi-layer protocol architecture. Among its features is support for coherent transactions (e.g., memory coherency).

Other recent advancements include multi-core processors and System on a Chip (SoC) architectures. Rather than interfacing discrete components on a printed circuit board or through use of other package configurations, on an SoC multiple components are integrated onto a single integrated chip. SoCs offer a number of advantages, including denser packaging, higher speed communication between functional components, and lower temperature operation. However, while processing capabilities can be scaled by using additional processor cores, interconnect bandwidth cannot be similarly scaled, and the prospects for increasing bandwidth through use of higher clock rates is rather limited. As a result, interconnect bottlenecks associated with IO accesses such as memory transactions is a key road block to scaling SoC performance.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 shows a packet format comprising four KTI Flits used to transfer a 64 Byte cache line;

FIG. 12 shows a packet format comprising four KTI Flits used to transfer 64 Bytes of data corresponding to an EBDW transfer;

FIG. 14 shows a variation of the basic KTI Flit format employing 8 lanes;

FIG. 15 shows a variation of the basic KTI Flit format employing 12 lanes;

FIG. 16 shows a variation of the basic KTI Flit format employing 16 lanes;

FIG. 17 shows a variation of the basic KTI Flit format employing 6 lanes;

DETAILED DESCRIPTION

Figure 1:
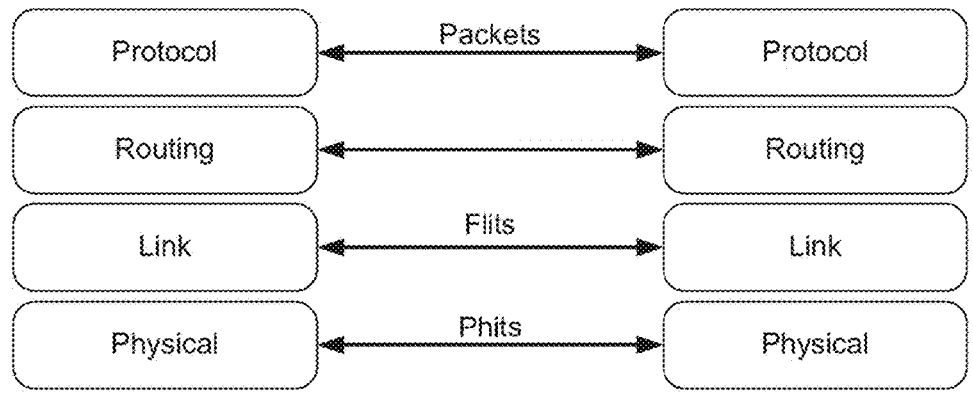
FIG. 1 is a block diagram depicting the layers of the KTI protocol stack.

Embodiments of methods, systems, and apparatus for implementing flow control units for transporting multiple pieces of transaction data over high-speed interconnects are described herein. In the following description, numerous specific details, such as implementations employing Keizer Technology Interface (KTI) interconnects and protocols, are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. For example, the labeling of the fields in various Figures provides information identifying the field and/or its function; such information cannot be conveyed alone with separate reference numbers. Additionally, reference numbers referring to a particular type of component (as opposed to a particular component) may be shown with a reference number followed by "(typ)" meaning "typical." It will be understood that the configuration of these components will be typical of similar components that may exist but are not shown as labeled separately in the drawing Figures for simplicity and clarity.

Overview of Keizer Technology Interface

Keizer Technology Interface (KTI) is a recently developed interface and associated protocols that leverages some aspects of QPI and provides extended functionality. As with QPI, KTI transactions are facilitated via packetized messages transported over a multi-layer protocol. As shown in FIG. 1, the layers include a Physical layer, a Link layer, a Transport layer, and a Protocol layer. Under KTI, data is exchanged in Physical Units called phits at the Physical layer. At the Link layer phits are aggregated into 192-bit Flow Control Units called Flits. At the Protocol layer, messages are transferred between agents using a packet-based transport.

Figure 2:
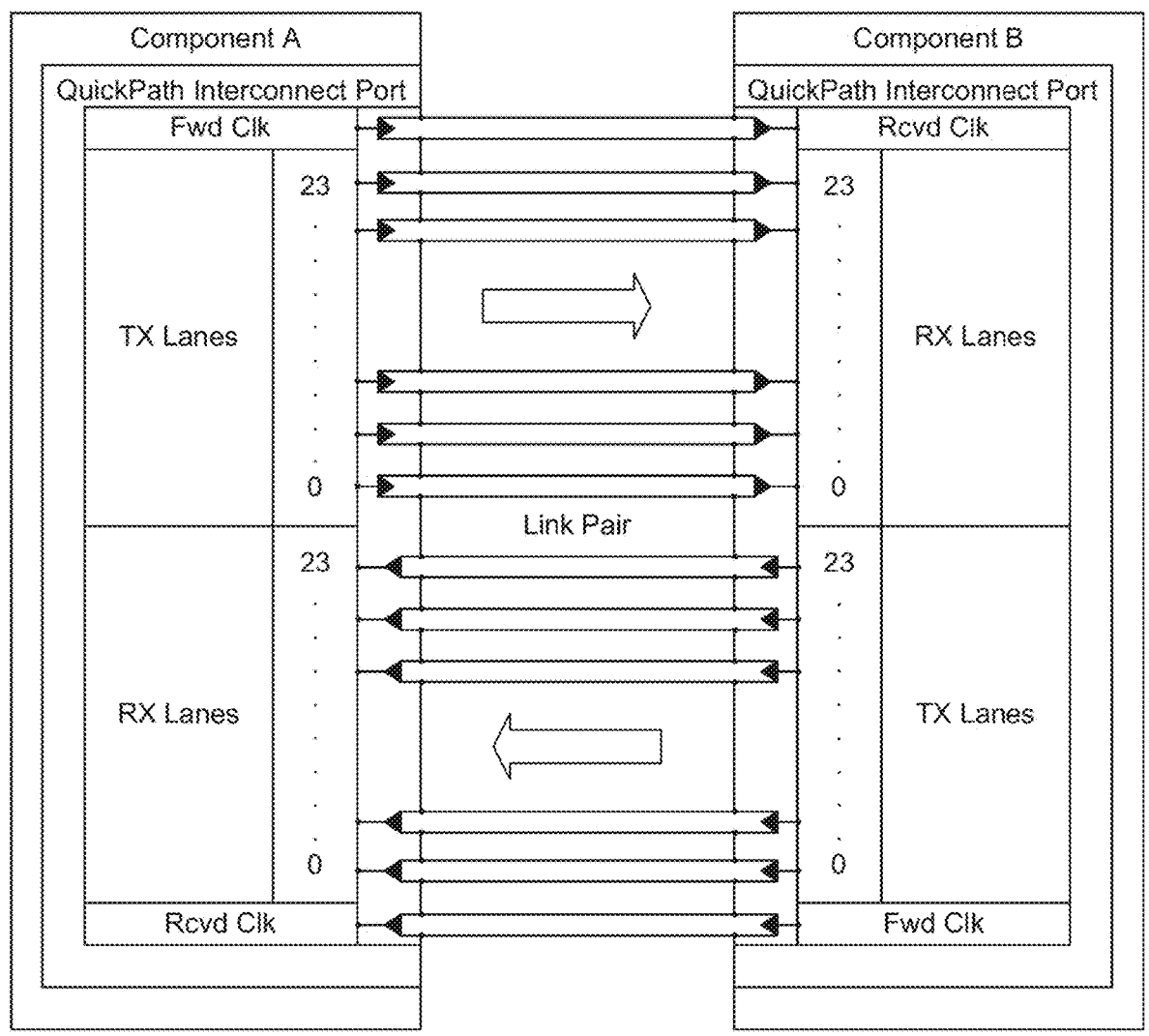
FIG. 2 is a schematic diagram illustrating the structure of a KTI link.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown in FIG. 2, the physical connectivity of each interconnect link is made up of a plurality of differential signal pairs (an exemplary set of 24 differential signal pairs is shown) plus a differential forwarded clock. Each port supports a link pair consisting of two uni-directional links to complete the connection between two components. This supports traffic in both directions simultaneously. The differential signal pairs are also referred to as lanes, such that a KTI link comprises a plurality of lanes.

Components with KTI ports communicate using a pair of uni-directional point-to-point links, defined as a link pair, as shown in FIG. 2. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link is defined with respect to a specific KTI agent. The Component A transmit link transmits data from Component A Tx port to Component B Rx port. This same Component A transmit link is the Port B receive link.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a Flit granularity and transfers Flits across the link at a phit granularity. A Flit is composed of integral number of phits, where a phit is defined as the number of bits transmitted in one unit interval (UI). For instance, in one embodiment a full-width (i.e., 24 lane) KTI link transmits and receives a complete 192-bit Flit using 8 phits. As shown in FIGS. 15-18 below, other KTI lane widths and corresponding phit sizes may also be implemented.

The Routing layer is responsible for ensuring that messages are sent to their proper destinations, and provides the framework for directing packets through the interconnect fabric. If a message handed up from the Link layer is destined for an agent in another device, the Routing layer forwards it to the proper link to send it on. All messages destined for agents on the local device are passed up to the Protocol layer.

The Protocol layer serves multiple functions. It manages cache coherence for the interface using a write-back protocol. It also has a set of rules for managing non-coherent messaging. Messages are transferred between agents at the Protocol level using packets. The Protocol layer manages delivery of messages across multiple links, involving multiple agents in multiple devices. The system's cache coherency across distributed caches and memory controllers is maintained by distributed agents that participate in coherent memory space transactions, subject to rules defined by the Protocol layer. The KTI coherency protocol supports home Snoop behaviors.

KTI Flit

In accordance with embodiments described herein, a 192-bit KTI Flit, referred to as a KTI Flit, and associated formatting and field configurations are provided. In one embodiment depicted in FIG. 3 as a KTI Flit basic format 300, the 192 bits are transferred over a KTI link employing 24 lanes (as shown in FIG. 2) using 8 UI's. As illustrated, 22 lanes labeled L2-L23 are used for transferring 176 information (I) bits, with the remaining two lanes L0 and L1 used for a 16-bit CRC comprising CRC (C) bits that are derived from calculations performed on the 176 information bits. For a given interconnect link lane configuration, the basic format for a KTI Flit is the same. However, the cells of the basic format may be configured into various fields in accordance with corresponding specific KTI Flit formats. Accordingly, a specific format, as used herein, is a version of the basic KTI Flit format with a specific field configuration, or sets of field configurations for packets comprising multiple KTI Flits.

Figures 3, 4:
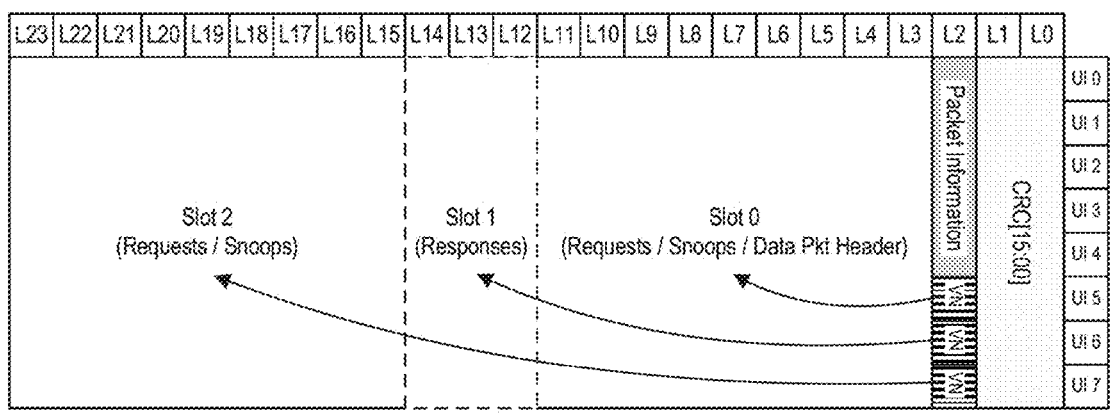
FIG. 3 shows a basic format of a KTI Flit employing 24 lanes, according to one embodiment.
FIG. 4 shows a multi-slotted format of the KTI Flit of FIG. 3 that facilitates transfer of multiple pieces of transaction data in a single KTI Flit.

In accordance with one aspect of some embodiments, a single 192-bit KTI Flit is configured to facilitate transfer of multiple pieces of data relating to a coherent memory transaction. For example, FIG. 4 shows a multiple transaction data KTI Flit format 400 having three slots 0, 1, and 2, with each slot used for transferring a separate piece of memory transaction data. As illustrated, lane L2 comprises 5 bits of packet information, while the next 9 lanes L3-L11 are nominally associated with slot 0, which may contain information relating to Requests, Snoops, or data packet headers. Slot 1 is nominally associated with data occupying lanes L12-L14, and is used for Responses. Slot 2 is nominally associated with lanes L15-L23, and is used for Requests or Snoops. Further shown are three VN bits, each associated with a respective slot 0, 1, or 2, as shown. As discussed above, lanes L0 and L1 are used for a 16-bit CRC.

The terminology "nominally associated" with Slot 0, 1, or 2 is meant to convey that the data corresponding to each slot is not fixed to a rigid slot boundary or number of bits occupied by the slots lanes, but rather most of the data associated with a slot for a particular configuration is within the lanes shown. Accordingly, the boundaries between lanes L12 and L11 and between lanes L15 and L14 are shown as dashed lines in some of the Figures herein.

By implementing a multiple slot configuration, the KTI Flit enables multiple pieces of data to be transferred in the same Flit. This is very advantageous, as it is common to implement pieces of data relating to the same memory transaction, such as Requests, Responses, and Snoops, and thus by combining such pieces of data together, the overhead that would have previously been associated with individual QPI packets (one for each piece of data) is reduced. In addition, the packing efficiency of the KTI Flit is enhanced over the QPI Flit.

Figure 4A:
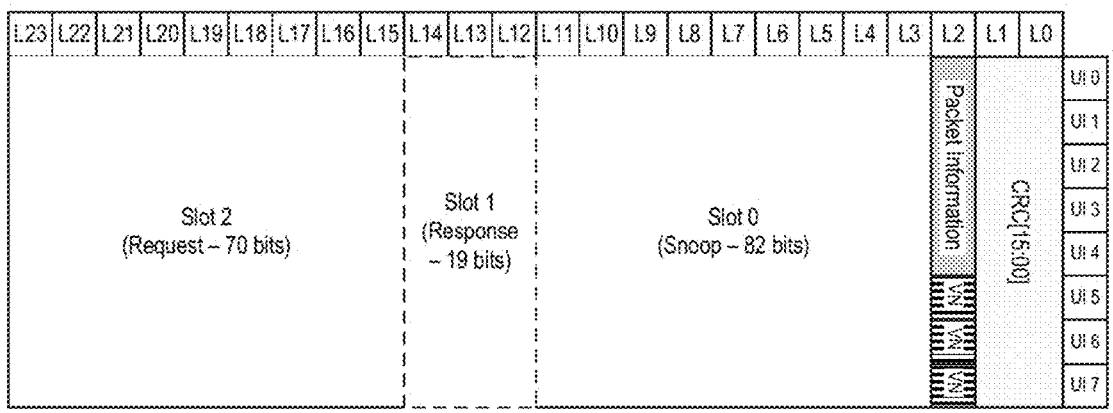
FIG. 4A shows a multi-slotted format of a KTI Flit configured to transfer a combination of a Request, a Response, and a Snoop.
Figure 4B:
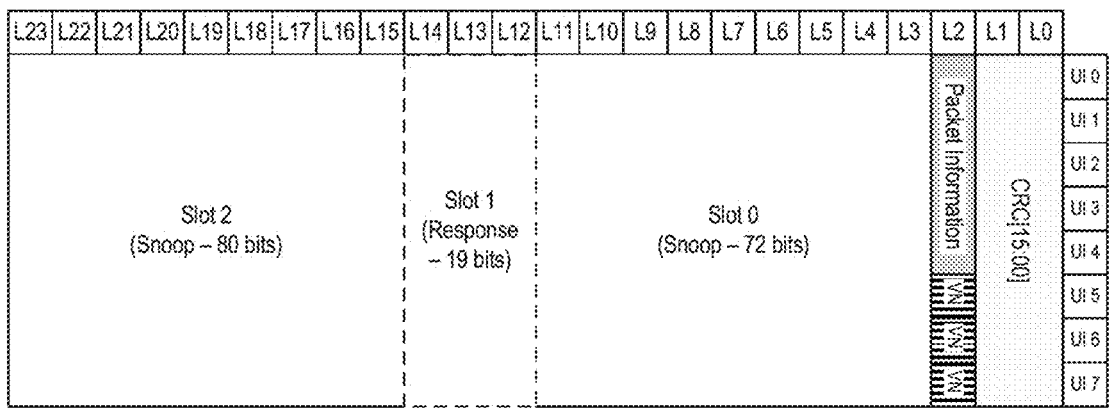
FIG. 4B shows a multi-slotted format of a KTI Flit configured to transfer a combination of a pair of Snoops and a Response.
Figure 4C:
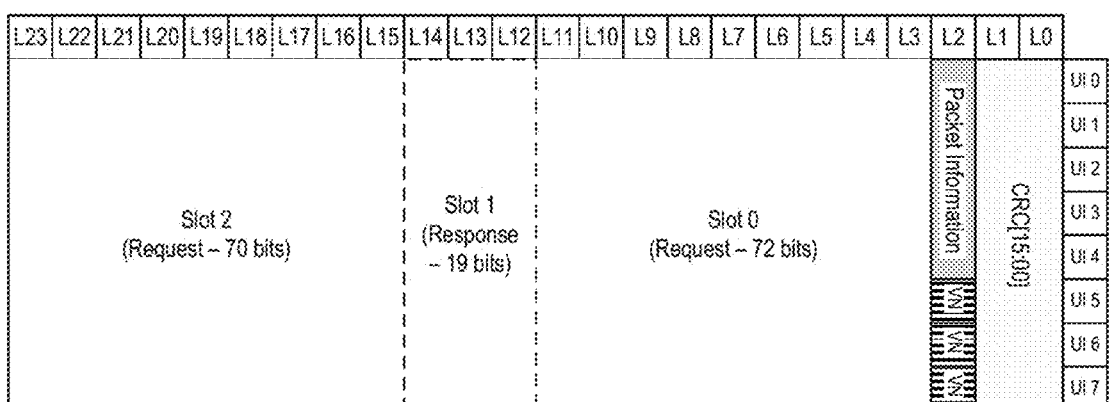
FIG. 4c shows a multi-slotted format of a KTI Flit configured to transfer a combination of a pair of Requests and a Response.

FIGS. 4A-4C depict three exemplary KTI Flit configurations in which different combinations of pieces of data relating to memory transactions may be conveyed in a single KTI Flit. FIG. 4A shows a KTI Flit format 400A for transferring combined pieces of data pertaining to a Request (comprising 70 bits of slot 2), a Response (comprising 19 bits of slot 1), and a Snoop (comprising 82 bits of slot 0). FIG. 4B shows a KTI Flit format 400B for transferring combined pieces of data pertaining to a first Snoop (comprising 80 bits of slot 2), a Response (comprising 19 bits of slot 1), and a second Snoop (comprising 72 bits of slot 0). FIG. 4C shows a KTI Flit format 400C for transferring combined pieces of data pertaining to a first Request (comprising 70 bits of slot 2), a Response (comprising 19 bits of slot 1), and a second Request (comprising 72 bits of slot 0). Further details of the formatting of fields associated various KTI Flit formats are shown in FIGS. 5-13, and discussed below.

Figures 5, 6:
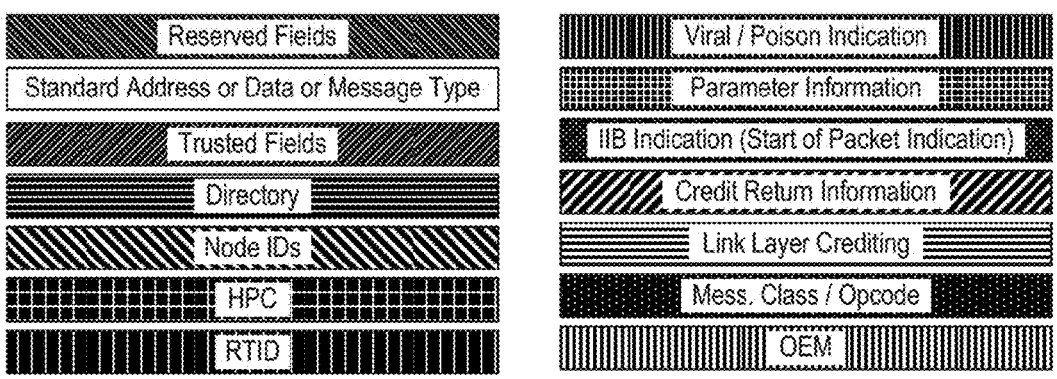
FIG. 5 shows a multiple transaction data KTI Flit format comprising the multi-slotted format of FIG. 4 configured to support transfer of pieces of transaction data corresponding to a Snoop or Request, a Snoop Response or completion, and a Request.
FIG. 6 shows a multiple transaction data KTI Flit format comprising the multi-slotted format of FIG. 4 configured to support transfer of pieces of transaction data corresponding to a Snoop or Request, a Snoop Response or completion, and a data Response.

For example, FIG. 5 illustrates a multiple transaction data KTI Flit format 500 that supports transfer of data corresponding to a combined first Request (slot 2), Response (slot 1), and second Request or Snoop (slot 0). In addition to the illustrated fields, a legend defining corresponding attributes of the fields is depicted at the bottom of the drawing page. The packet information bits in lane L2 include an IIB set bit, a reserved (RSVD) bit, a VNT bit, an Acknowledgement (Ack) bit, a Crd bit, and three VN bits. The IIB set bit is used to signal the start of a header of a new packet. The VNT and VN bits are used in connection with virtual networking aspects defined by KTI. The Ack bit is used in connection with link layer crediting. The Crd bit is used for credit return information.

Lanes L3-L7 and 6 bits of lanes L8 are used for memory addresses, representing bits [06:51] of a 52-bit address. Lane L9 and 2 bits of Lane L8 contains a 10-bit Request Transaction Identifier (RTID). Under one embodiment, each memory Request transaction is allocated a corresponding RTID. Lane L10 contains a 4-bit DNID (Destination Node Identifier) and a 4-bit RHNID (Requesting Home agent Node Identifier). The last lane (L11) for slot 0 contains 7 bits corresponding to a message class and/or opcode, and a VN bit [what is this?].

Slot 1 contains 24-bits of Response data, including an 10-bit RTID or HTID (Home Agent Tracker Identifier) having portions in lanes L13, L14 and L11. Lane L12 contains a 4-bit DNID and a 4-bit message class or opcode. 7 bits of lane L14 and 3 bits of lane L15 are used for a 10-bit HTID, which is only used for Snoops.

The formatting of slot 2 is similar to the formatting of slot 0, and is used for transferring 72-bit Request data. Lanes 16-L21 contain address data, while lane L21 and two bits of lane L21 contain a 10-bit RTID. Lane L23 contains a 4-bit DNID and a 4-bit RHNID. Lane L15 also contains 5 bits corresponding to a message class and/or opcode. As before, lanes L0 and L1 contain a 16-bit CRC.

FIG. 6 depicts a multiple transaction data KTI Flip format 600 used to transfer data corresponding to a combined Snoop or Request (slot 2), Snoop Response or completion (slot 1), and a data Response (slot 0). The data in each of lanes L0-L2, and slots 1 and 2 are the same as described above for multiple transaction data KTI Flit format 500 of FIG. 5, with differences corresponding to slot 0, which contains data corresponding to a data Response rather than a Request. Bits [7:5] of lane L3 are reserved, while bits [4:2] contain directory information Prior Cache Line State (PCLS). This field provides some type of statistical information about data transfer (did the information come from a cache, is it modified?, is it in SHARED state?, etc.). PCLS is used in conjunction with performance counters to categorized software and memory usage. Lane L4 in combination with bits [1:0] of lane L3 contains a 10-bit conflict RTID that is used to indicate that more than one caching agent is requesting access to a given address. Lane L5 contains a 4-bit Response data state, a 2-bit Response status, and a 2-bit Request state.

Lanes L6 and L7 contain 7-bit node identifiers. These include a Source node Identifier (SID), and a Requester/Sender node identifier (RSNID). The remaining bit in each of lanes L6 and L7 is reserved. A 7-bit Requester/Home agent node identifier (RHNID) is stored in a portion of lanes L8 and L10, while a 7-bit Destination node identifier (DNID) is stored in another portion of lanes L8 and L10. In addition, lane L11 contains a 7-bit message class/opcode.

Figure 7:
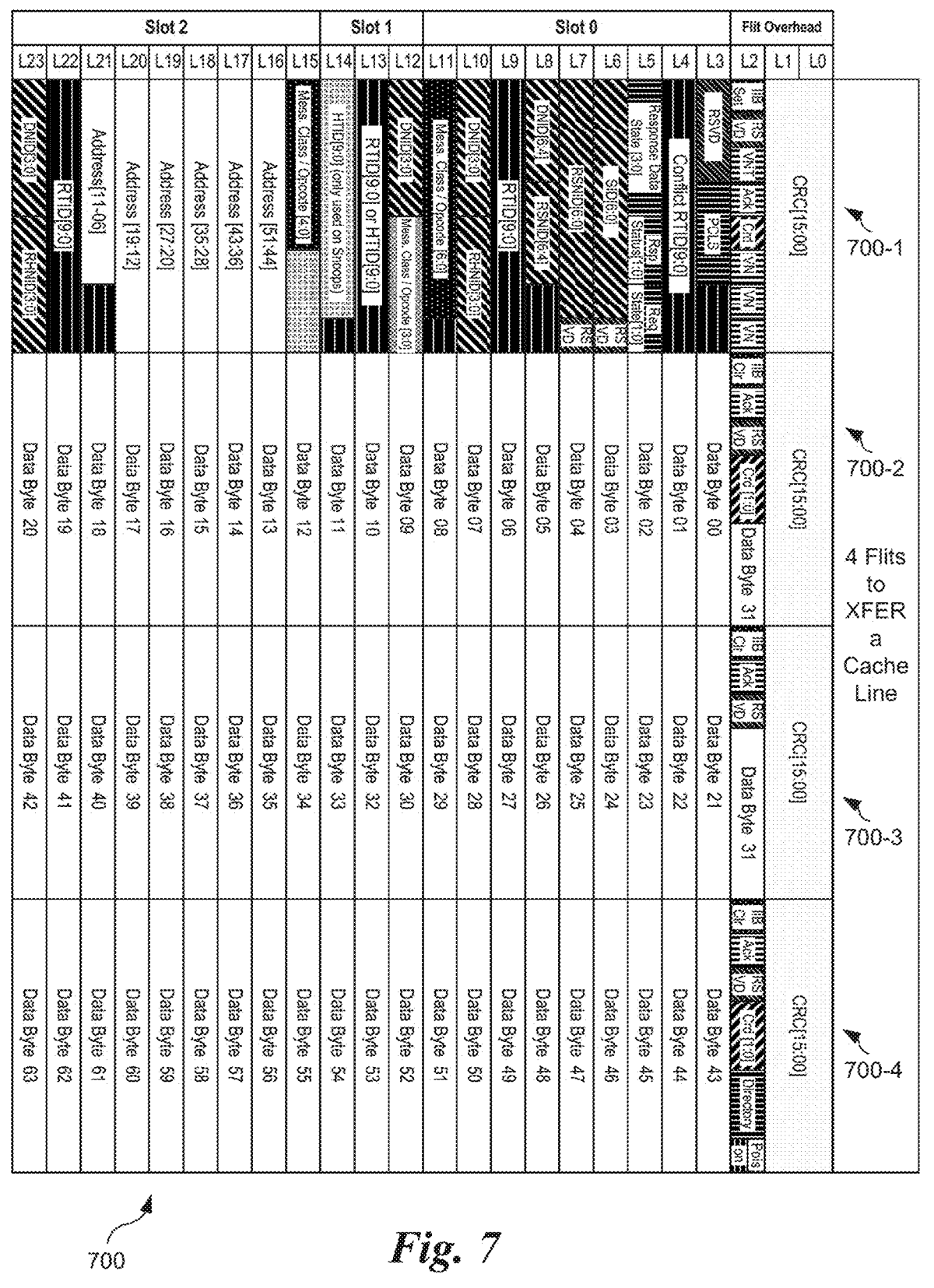

FIG. 7 shows a packet format 700 comprising four KTI Flits 700-1, 700-2, 700-3, and 700-4 used to transfer a 64 byte cache line, according to one embodiment. KTI Flit 700-1 contains information corresponding to the transfer, which includes a Request (slot 2), a Response (slot 1), and a data Response (slot 0), having the same field format as the KTI Flit format 600 of FIG. 6. KTI Flits 700-2, 700-3, and 700-4 contain the cache line data, comprising Data Bytes 00-63, with all but Data Byte 31 stored as an 8-bit field within a respective lane and associated KTI Flit. As depicted, the 8-bits of Data Byte 31 are divided into two parts, with bits [7:5] in Lane 0 of the KTI Flit 700-2, and bits [4:0] in Lane 0 of KTI Flit 700-3.

Figure 8:
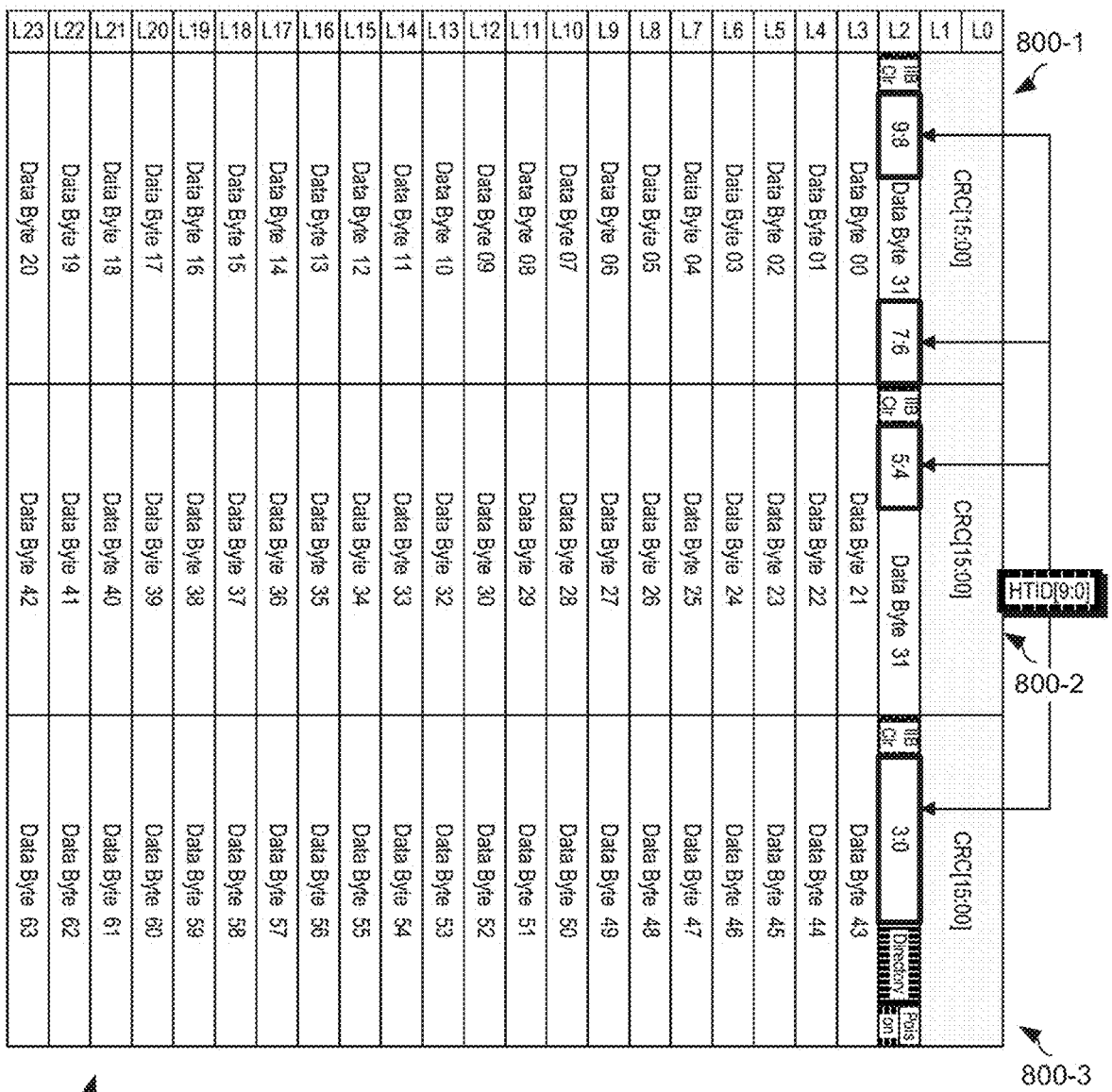
FIG. 8 shows a headerless packet format comprising three KTI Flits used to transfer a 64 Byte cache line.

In accordance with another embodiment shown in FIG. 8, a 64 byte cache line can be transferred with three KTI Flits using a "headerless" packet format 800, including KTI Flits 800-1, 800-2, and 800-3. One aspect of the headerless packet format is the encoding of the HTID associated with the transaction in lane L0. As shown, the HTID comprises a 10-bit value, with bits [9:8] and [7:6] being encoded in KTI Flit 800-1, bits [5:4] being encoded in KTI Flit 800-2, and bits [3:0] encoded in KTI Flit 800-3.

Lane L2 further includes the following encodings. Each of KTI Flits 800-1, 800-2, and 800-3 include an IIB Clr bit. Data Byte 31 is split across KTI Flits 800-1 and 800-2 as shown. KTI Flit 800-3 further includes two directory bits and a poison bit. The 64 byte cache line data, absent Data Byte 31, is contained in lanes L3-L23, as shown. In addition, lanes L0 and L1 are used for 16 bit CRC's.

Figure 9:
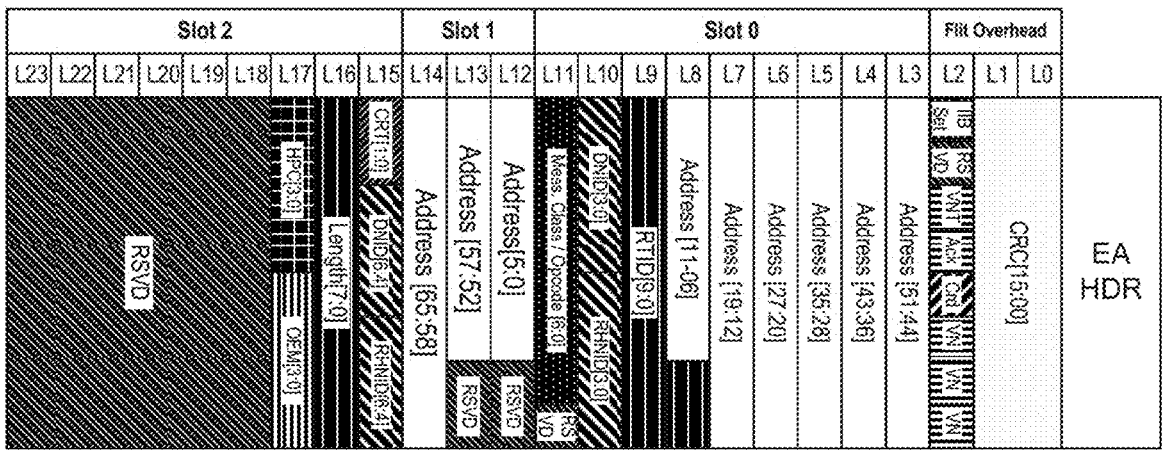
FIG. 9 shows a KTI Flit format corresponding to a EA header.

FIG. 9 shows a KTI Flit format 900 corresponding to an EA (Extended Address) header. Slot 0 of the EA header has the same fields as a Request discussed above; however, it is noted that although the fields are the same, the slot 0 data is not used for a Request in this usage. Lanes L12-L14 of slot 1 primarily contain address bits corresponding to a 66-bit address, including address bits [5:0] in lane L12, address bits [57:52] in lane L13, and address bits [65:58] in lane L14. The other fields in lanes L10 and L11 are two-bit reserve fields. Lane 15 of slot 2 includes a two-bit credit return information field, bits [6:4] of a DNID (the other DNID bits [3:0] are in lane L10) bits [6:4] of an RHNID (the other RHNID bits [3:0] are in lane L10). Lane L16 contains an 8-bit length field. Lane L17 includes a 4-bit HPC (High Performance Computing) field and a 4-bit OEM (Original Equipment Manufacturer) field, which may be encoded according to a manufacturer's own encoding scheme. The remaining lanes L18-L23 of slot 2 are reserved for potential future use.

Figure 10:
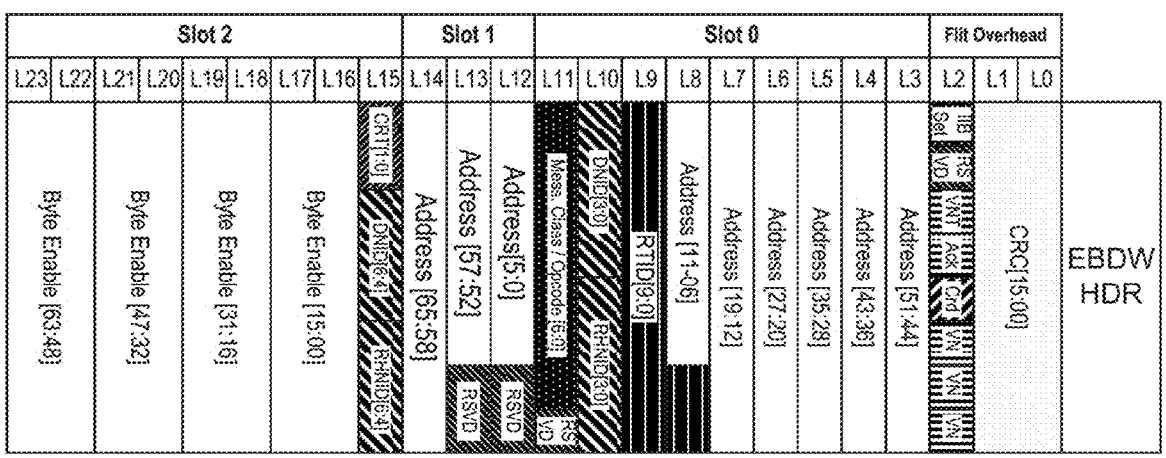
FIG. 10 shows a KTI Flit format corresponding to an EBDW (Extended Byte Enable Data Write) header

FIG. 10 shows a KTI Flit format 1000 corresponding to an (Extended Byte Enable Data Write (EBDW) header. The EBDW format is used to write back a cache line to memory. For example, one time this is done is for a capacity eviction of a cache where the line is modified). The fields in slots 0 and 1 and lanes L3 and L15 are the same as for KTI Flit format 900 of FIG. 9. The remaining lanes L16-L23 of slot 2 are used for 64 Byte Enable bits, as illustrated.

Figure 11:
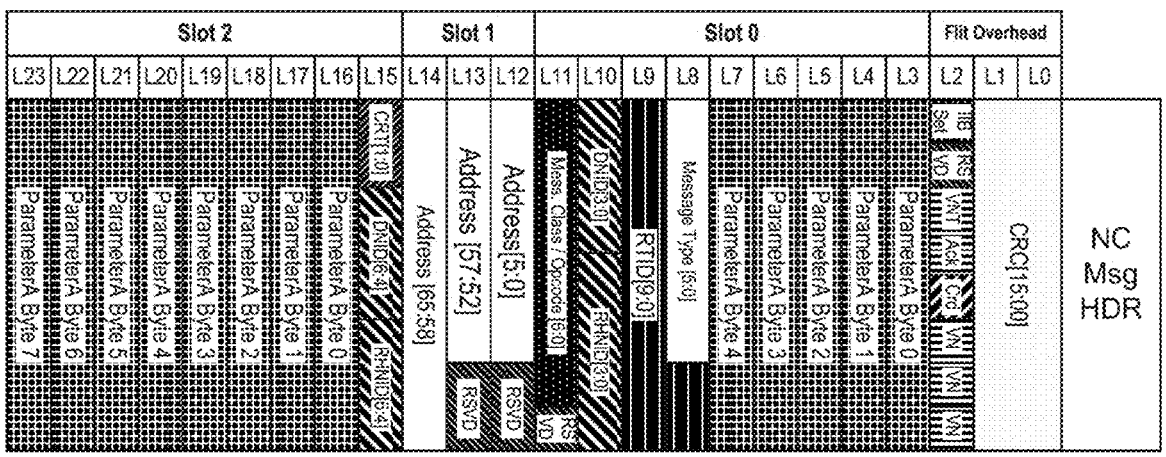
FIG. 11 shows a KTI Flit format corresponding to a non-coherent message header.

FIG. 11 shows a KTI Flit format 1100 corresponding to a non-coherent (NC) message header. The fields in Lane L0 are the same a previously described above for various KTI Flit formats (e.g., format 500). Lane L9 and a portion of lane L8 contains an 10-bit RTID, while the remaining six bits of lane L8 are used to encode a message type. In a manner similar to KTI Flit formats 9000 and 1000, portion of lanes L10 and L15 contain an 7-bit DNID and a 7-bit RHNID.

The remaining lanes L3-L7 and L16-L23 contain ParameterA Byte data, as illustrated. In particular, ParameterA Bytes 0-4 are included in slot 0, while ParameterA Bytes 0-7 are included in slot 2. The ParameterA Byte data are used to transfer parameter information in corresponding non-coherent messages.

Figure 12:
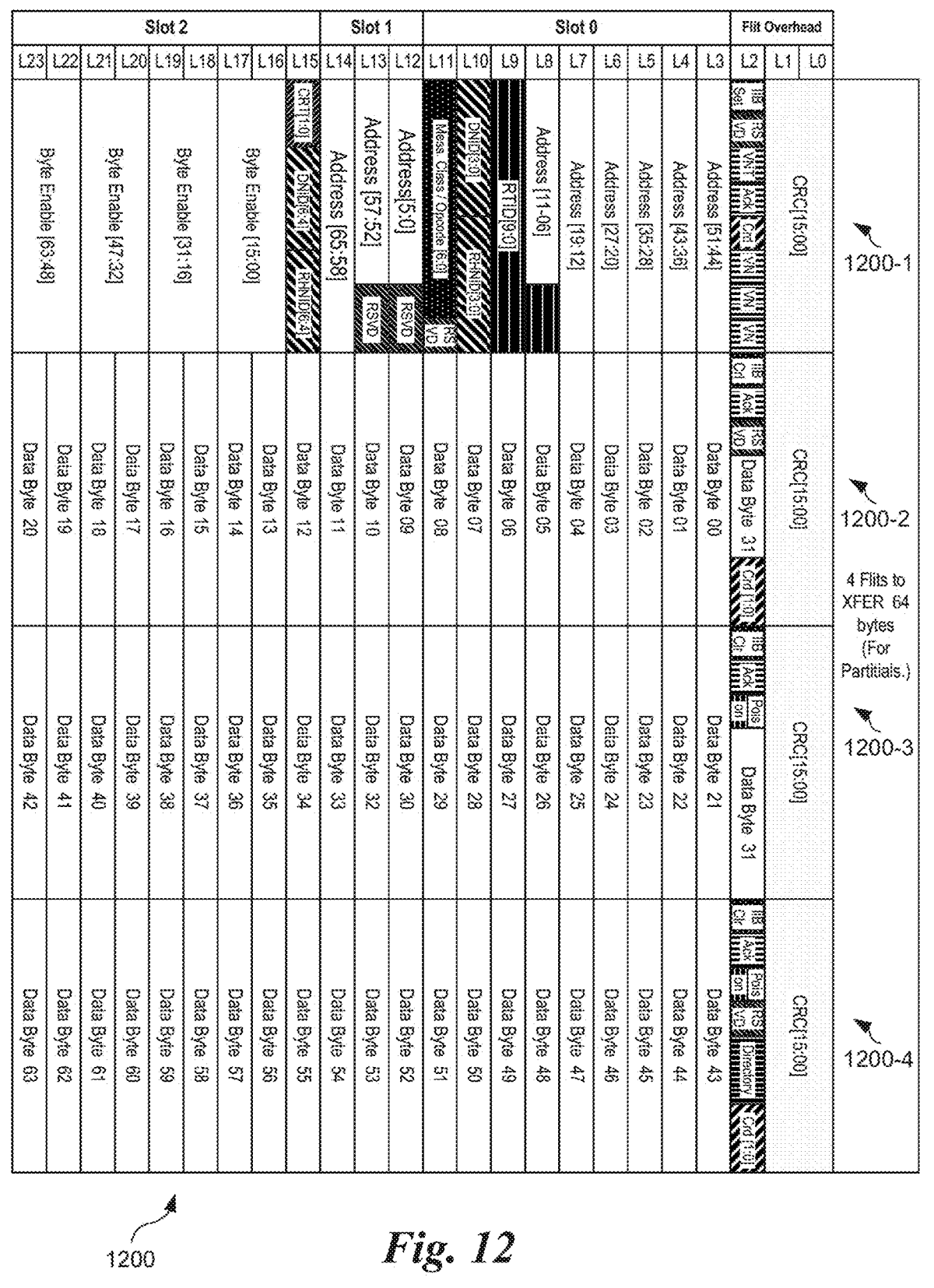

FIG. 12 shows a packet format 1200 comprising four KTI Flits 1200-1, 1200-2, 1200-3, and 1200-4 configured to support a 64 Byte EBDW transfer. The fields in lane L2 are the same as those discussed above with reference to the four KTI Flit 64 Byte cache line transfer packet format 700 of FIG. 7. Moreover, the formatting of KTI Flit 1200-1 is the same as the EBDW header format 1000 of FIG. 10. The 64 Byte payload data is contained in corresponding 8-bit fields occupying lane L3-L23 of KTI Flits 1200-2, 1200-3, and 1200-4, except that Data Byte 31 data is split across portions of lane L0 for KTI Flits 1200-2 and 1200-3.

Figure 13:
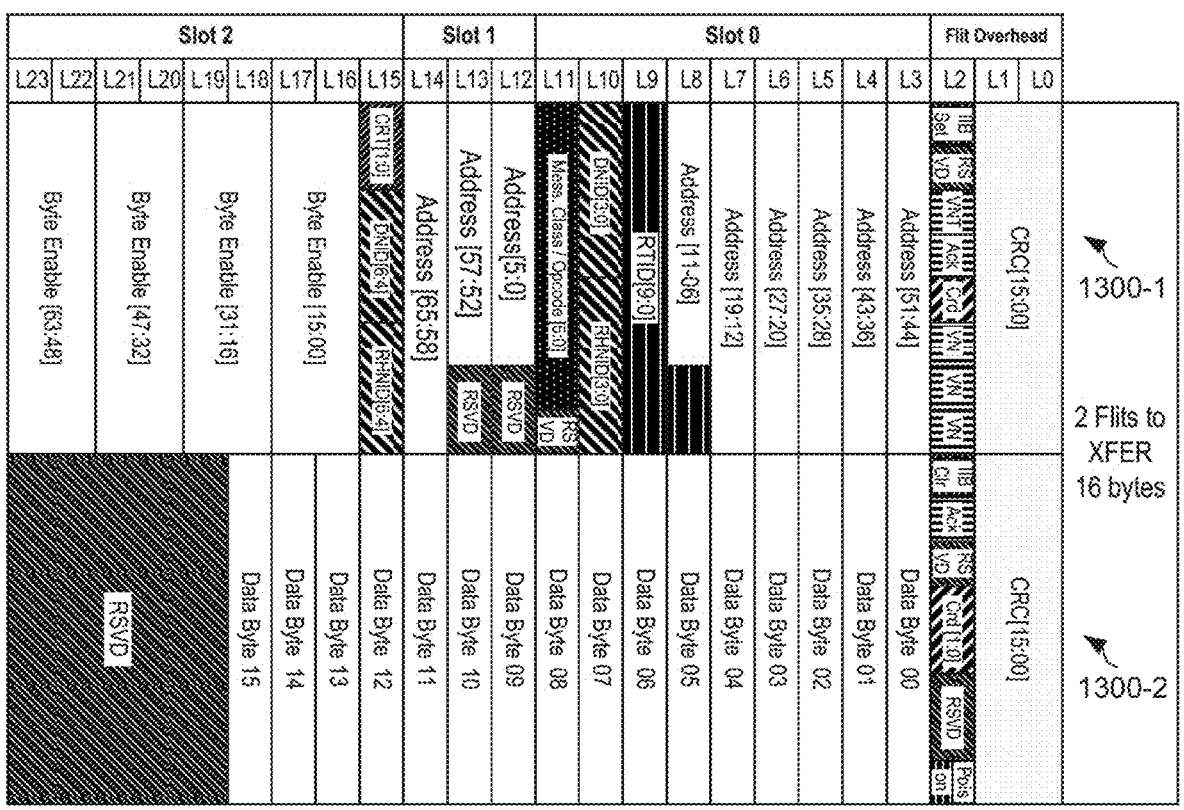
FIG. 13 shows a packet format comprising two KTI Flits used to transfer 16 Bytes of data.

FIG. 13 shows a two KTI Flit packet format 1300 that supports a 16 Byte transfer. The format of KTI Flit 1300-1 is the same the EBDW header format 1000 of FIG. 10. The fields in lane L0 of KTI Flit 1300-2 include an IIB Clr bit, an Ack bit, a reserved bit, a two-bit credit information field, two additional reserved bits and a poison bit. Lanes L3-L18 contain respective Data Bytes 00-15. Lanes 19-23 are reserved for potential future use. As before, lanes L0 and L1 are used for 16-bit CRCs.

Figures 16, 17:
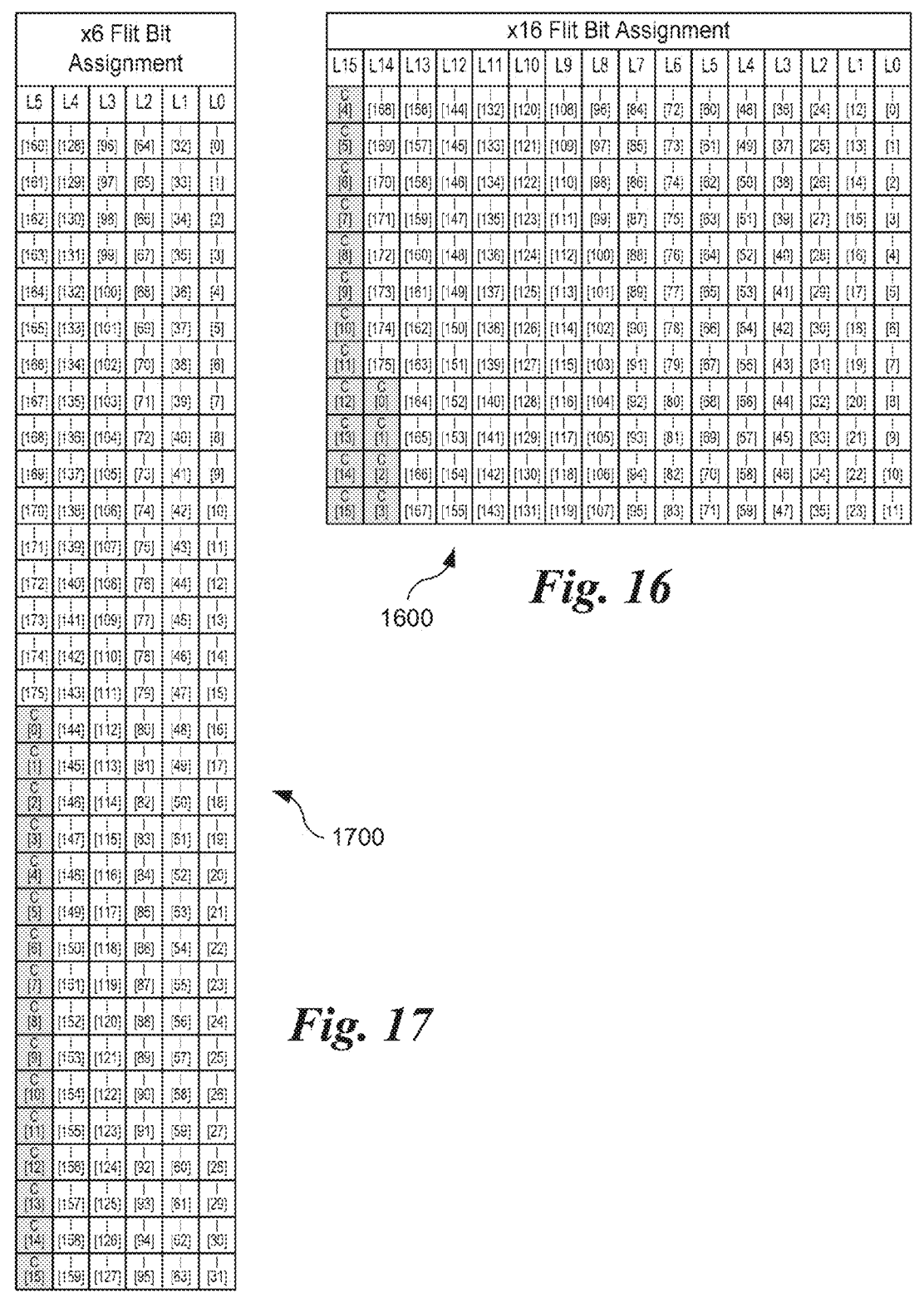

In addition to supporting a 24 lane configuration, formats are provided for mapping corresponding information bits and CRC bits of KTI Flit basic format 300 of FIG. 3 to other lane width configurations. For example, FIG. 14 shows an x8 (i.e., 8 lane) Flit bit assignment table 1400 for a 192-bit KTI Flit. Similarly, an x12 Flit bit assignment table 1500 is shown in FIG. 15, an x16 Flit bit assignment table 1600 is shown in FIG. 16, and an x6 Flit bit assignment table 1600 is shown in FIG. 17, wherein each table includes 176 information bits and 16 CRC bits for a total of 192 bits. Each cell in each table has a respective information bit number or CRC bit number that identifies a corresponding cell shown in KTI Flit basic format 300, which are mapped to corresponding information bit numbers and CRC bit numbers in basic format 300. Accordingly, the same information bits in basic format 300 would contain the same data in each of the alternate formats, as would the same CRC bits.

In general, functional aspects of the embodiments described herein can be implemented via logic embedded in corresponding components or functional blocks comprising integrated circuits and the like. For example, logic for implementing operations performed by KTI agents at KTI link endpoints may be implemented using standard integrated circuit design and manufacturing techniques, as will be recognized by those skilled in the art. In addition, circuitry for support the Physical layer transport defined herein may likewise be implemented using standard design and manufacturing techniques.

Figure 18:
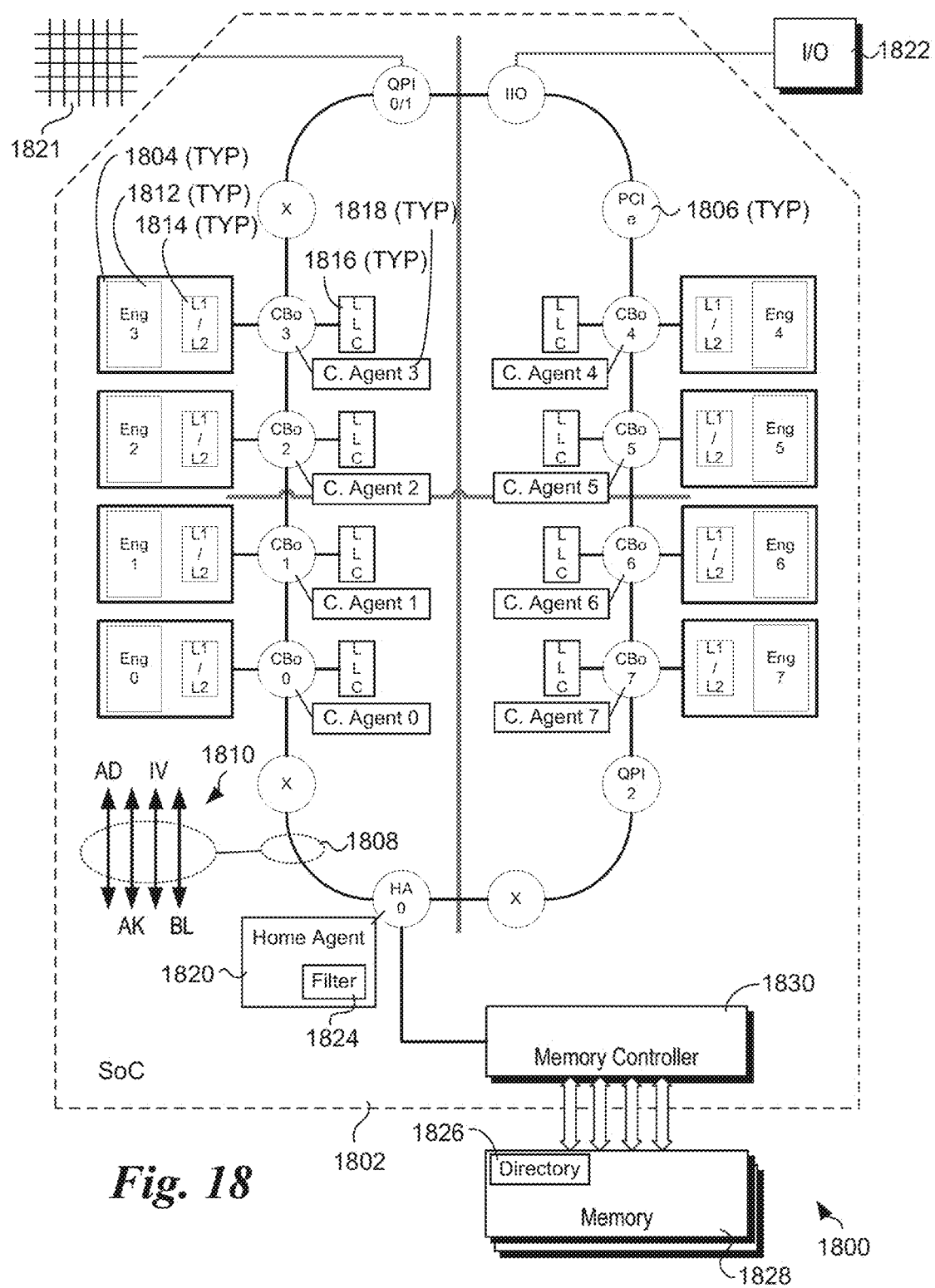
FIG. 18 is a block schematic diagram of an SoC architecture employing a ring interconnect coupling a plurality of nodes and employing various agents to support use of KTI Flits in connection with coherent memory transactions, according to one embodiment.

In accordance with some embodiments, logic for implementing the KTI Flit formats provided herein may be integrated on a System on a Chip (SoC). For example, FIG. 18 shows a system 1800 that employs KTI signaling and messaging for supporting coherent memory transactions, as well as non-coherent KTI messages. System 1800 is illustrative of an advanced system architecture implemented in an SoC 1802 including multiple processor cores 1804, each coupled to a respective node 1806 on a ring interconnect 1808. For simplicity, the nodes for ring interconnect 1808 are shown being connected with a single line. As shown in detail 1810, in one embodiment each of these ring interconnects include four separate sets of "wires" or electronic paths connecting each node, thus forming four rings for ring interconnect 1808. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

Each node labeled CBo n (where n is a number) is a node corresponding to a processor core sharing the same number n (as identified by the core's engine number n). In the architecture of FIG. 18, there are eight processor cores including processor engines 0-7. However, this is merely exemplary, as the number of processor cores (and associated components described below) may generally comprise two or more processor cores. Each of processor cores 1804 includes an in L1/L2 cache 1812 and a processor engine 1814. Also connected to each CBo n node is an LLC (Last Level Cache) "slice" 1816 and a caching agent 1818.

In one embodiment the LLC slices are implemented as a distributed last level cache. Under this distributed LLC scheme, each of the other processor cores has access to all of the distributed LLC cache slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 18 for simplicity and clarity.

There are also other types of nodes shown in SoC 1802 including QPI nodes 0/1 and 2, an IIO node, a PCIe node, and a home agent (HA) node HA 0 to which a home agent 1820 is coupled. QPI node 0/1 is depicted as being coupled to a fabric interconnect 1821. Moreover, in one embodiment, QPI node 0/1 provides QPI interface circuitry comprising two separate QPI interfaces. The IIO node is operatively coupled to an Input/Output interface 1822. Further shown are a number of nodes marked with an "X"; these nodes are used for timing purposes. It is noted that the QPI, IIO, PCIe and X nodes are merely exemplary of one implementation architecture, whereas other architectures may have more or less of each type of node or none at all. Moreover, other types of nodes (not shown) may also be implemented.

In one embodiment, data is passed between nodes in a cyclical manner. For example, for each real or logical clock cycle (which may span one or more real clock cycles), data is advanced from one node to an adjacent node in the ring. In one embodiment, various signals and data may travel in both a clockwise and counterclockwise direction around the ring. In general, nodes 1806 may comprise buffered or unbuffered nodes. In one embodiment, at least some of nodes 1806 are unbuffered.

Each of caching agents 1818 is configured to perform messaging relating to signal and data initiation and reception in connection with a coherent cache protocol implemented by the system, wherein the caching agent handles cache-related operations corresponding to addresses mapped to its collocated LLC 1816. In addition, in one embodiment home agent 1820 employs a filter 1824, and the various caching and home agents access and update cache line usage data stored in a directory 1826 that is implemented in a portion of memory 1828 that is accessed via a memory controller 1830. It will be recognized by those skilled in the art that other techniques may be used for maintaining information pertaining to cache line usage.

In the context of system 1800, a cache coherency scheme may be implemented by using independent message classes. Under one embodiment of a ring interconnect architecture, independent message classes may be implemented by employing respective wires for each message class. For example, in the aforementioned embodiment, ring interconnect 1808 includes four ring paths or wires, labeled and referred to herein as AD, AK, IV, and BL. Accordingly, since the messages are sent over separate physical interconnect paths, they are independent of one another from a transmission point of view.

Home agent 1820 interacts with caching agent 1818 to manage cache line usage by the various memory consumers (e.g., processor cores 1804). In particular, these entities support a coherent memory scheme under which memory can be shared in a coherent manner without data corruption. To support this functionality, home agent HA 1820 employs filter 1824, and the caching and home agent access and update cache line usage data stored in directory 1826. In one embodiment, portions of memory 1828 are logically partitioned as 64 byte cache lines.

Figure 18A:
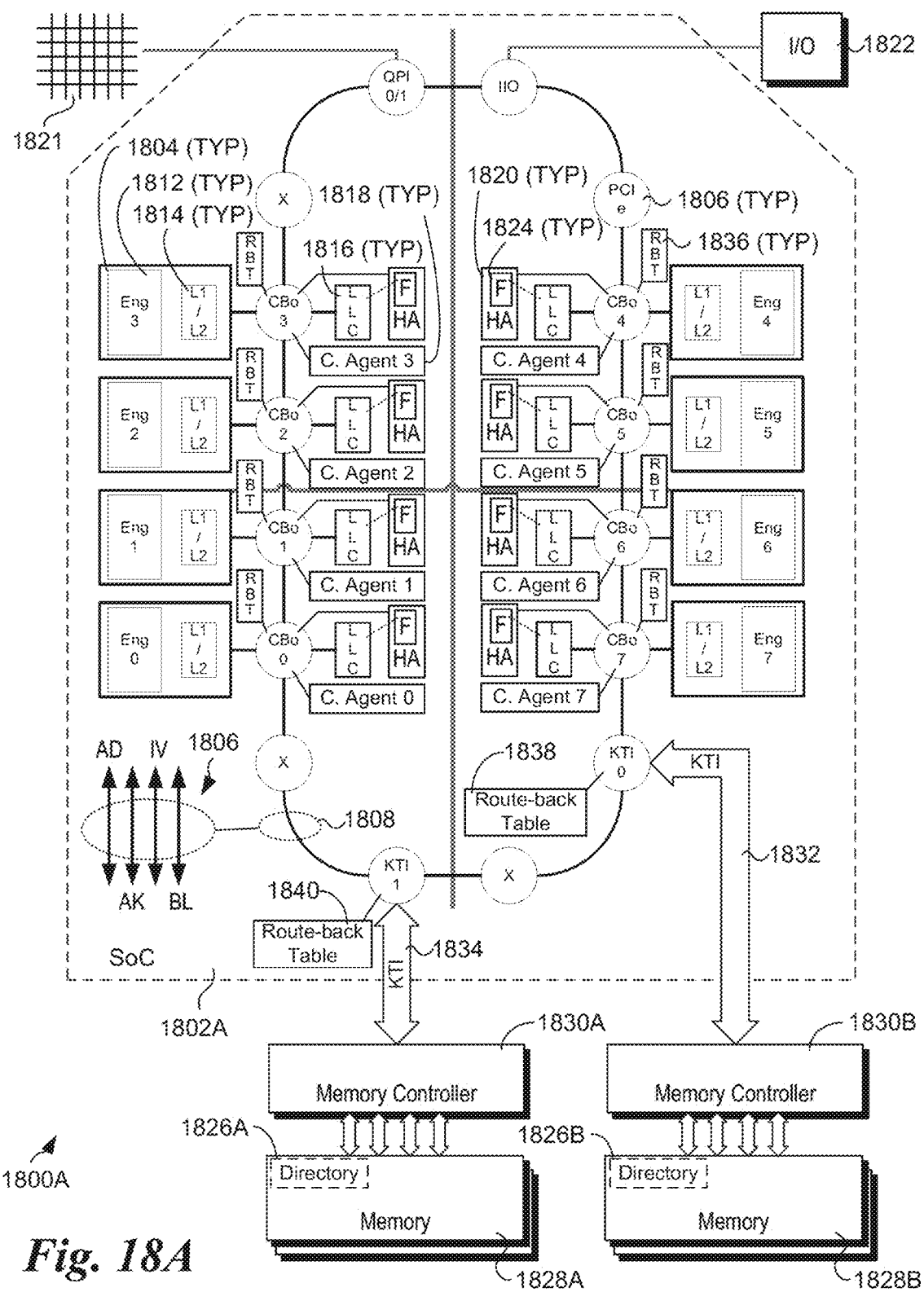
FIG. 18A is a block schematic diagram of an SoC architecture employing a ring interconnect coupling a plurality of nodes and implementing a distributed home agent configuration in combination with various agents to support use of KTI Flits in connection with coherent memory transactions, according to one embodiment.

FIG. 18A show details of a system 1800A comprising an augmentation of system 1800 of FIG. 18 that employs a plurality of distributed home agents 1820 on an SoC 1802A. As shown in FIG. 18A, each home agent 1820 is collocated with a respective caching agent 1818 and LLC slice 1816. Similarly, each home agent 1820 is operationally coupled to a respective processor core 1804. In one embodiment, caching agents and home agents are implemented via a common circuit block or box, or are otherwise considered as a single logical component, which is referred to as a caching home agent or CHA (not shown).

Distributed home agents 1820 are configured for performing memory coherency operations that are analogous to home agent 1820 discussed above. However, in this instance, each home agent 1820 is mapped to a portion or "slice" of memory (rather than a larger block), and that home agent is responsible for performing home agent operations associated with that portion of memory. Accordingly, the filtering function of the home agent is also distributed such that each distributed home agent 1820 includes a filter 1824. In one embodiment, the filter data is stored in the collocated LLC slice 1816. In one embodiment, the portion of memory associated with a home agent comprises a portion of memory accessed by a single memory controller. In another embodiment, a home agent may be associated with multiple portions of memory accessed via respective memory controllers, e.g., a first portion accessed via a first memory controller, a second portion accessed via a second memory controller, etc.

Distribution and collocation of home agents 1820 enables additional functionality to be implemented in architecture 1800A, including access to memory controllers that may be off-chip (e.g., separate from SoC 1802). Under one embodiment, this is facilitated by use of KTI links between KTI nodes on ring interconnect 1808 and applicable memory controllers, KTI agents and KTI link interface circuitry and logic. For example, this is depicted in FIG. 18A as KTI links 1832 and 1834 between KTI node 0 and a KTI node 1 (which has replaced node HA 0 in SoC 1802). Each of KTI links 1832 and 1834 links its KTI node with a respective memory controller 1830A and 1830B. Each of memory controllers 1830A and 1830B is used for controlling a respective memory 1828A and 1828B. In one embodiment, each of memory 1828A and 1828B includes a respective directory 1826A and 1826B. Under an alternative approach, directory information may be managed by a cache agent or a home agent rather than a memory controller. The memory controller also include KTI agents and KTI link interface circuitry and logic (not shown) configured to support transport of data between the memory controller and a KTI link interface at the other end of a KTI link.

RTID and HTID-Based Routing

As discussed above, home agents are employed to support coherent memory management, including maintaining cache line status and cache line location for the memory address range(s) allocated to each cache agent. Under architectures employing a single home agent per SoC, updating of cache line status and location is managed by a single entity and thus cache line usage information pertaining to memory managed by the home agent are routed to the single home agent. Based on the home agent cache line status and location information (i.e., where cached copies of the cache line may be located), the corresponding cache line data is retrieved from an appropriate source (either memory or an applicable cache) and a copy of the cache line is returned to the original requester, also referred to herein as the requesting entity. This requires routing the cache line data back to the requester, which is facilitated using KTI routing techniques described above. However, in accordance with the embodiment of FIG. 18A, the home agent operations are distributed in a manner that co-locates a home agent with a respective CBo (and corresponding processor core) and caching agent. As a result, rather than forwarding or otherwise maintaining cache line usage information at a single home agent, now such information is provided to or managed by a distributed set of home agents. At the same time, since the distributed home agents are co-located with processing cores at the CBo nodes, it is possible to tie the applicable home agents to corresponding memory transactions originating for CBo's and/or co-located processor cores.

One aspect of distributing and collocating home agents with caching agents and LLC slices is that transactions between a home agent and a memory controller (corresponding to cache lines managed by the home agent) do not need to include a routing address to the node to which the LLC is collocated. Rather, only the home agent needs to be identified, as explained in further detail below.

In one embodiment, routing information is implemented such that requested memory data is returned to the home agent of an applicable requestor without having to explicitly provide the routing information in the memory packets returned by a memory controller. This is facilitated, in part, through the use of a "route-back" table (RTB). The RTB contains home agent and CBo mapping information, along with other information used to generate Request Transaction Identifiers (RTIDs) or Home Agent Tracking Identifies (HTIDs), which are included in the memory transaction requests and encoded in the various KTI Flit formats such that the appropriate CBo node or home agent to which a memory request result is to be returned can be readily identified.

Returning to FIG. 18A, in one embodiment, a plurality of RBT instances 1836 (i.e., a copy of a route-back table applicable to a given CBo) are depicted as being operatively coupled to a respective CBo. In addition, route-back tables 1838 and 1840 are operatively coupled to respective nodes KTI 0 and KTI 1 (and accessible to the KTI agents at these KTI nodes). In general, applicable RTID data is looked-up in an RBT by a requesting entity (e.g., CBo or processor core) and embedded in an outbound memory transaction request. The RTID/HTID information is then processed by the KTI agents at nodes KTI 0 and KTI 1 (as applicable) to effect routing of memory request data returned from a memory source (e.g., memory controller or cache) back to the requester via the ring interconnect.

Various aspects of the embodiments disclosed herein may be implemented in architectures 1800 and 1800A of FIGS. 18 and 18A. Generally, each KTI link will have logic comprising a KTI agent and associated KTI link interface circuitry and logic at the end of each link. The KTI logic is configured to perform various operations relating to transmission of data over a KTI link in accordance with the KTI protocol. Accordingly, the KTI agents, in cooperation with other system components and logic, may be deployed to facilitate coherent memory transactions in system architecture such as architecture 1800 and 1800A, as well as non-coherent data messaging using the KTI protocol. Moreover, the KTI agents may be configured to employ one or more of the KTI Flit formats disclosed herein, and corresponding KTI links and/or KTI interface circuitry and logic may be implemented in the SoC silicon.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
    a memory;
    a port comprising:
        physical layer circuitry to support a physical layer of a link; and
        link layer circuitry to generate a flit to comprise:
            a set of informational fields, wherein the set of informational fields comprise fields to identify attributes of the flit;
            a plurality of slots, wherein a first one of the plurality of slots is to be encoded with a request or response of a first transaction, and a second one of the plurality of slots is to be encoded with a request or response of a second transaction; and
            a cyclic redundancy check (CRC) field to be encoded with a CRC value for the flit,
    wherein the physical layer circuitry is to transmit data blocks corresponding to the flit over a plurality of lanes of the physical layer to another device.

2. The apparatus of claim 1, wherein the plurality of slots comprises three slots.

3. The apparatus of claim 1, wherein the set of informational fields further comprises an acknowledgment field and a credit return field for the flit.

4. The apparatus of claim 1, wherein the first slot comprises an OpCode field and a field to identify one of a target of the response of the first transaction or a source of the response of the first transaction.

5. The apparatus of claim 1, wherein the CRC field is to be encoded with a 16-bit CRC value for the flit.

6. The apparatus of claim 1, wherein the link comprises a cache-coherent link.

7. The apparatus of claim 6, further comprising a cache coherency agent associated with the memory.

8. The apparatus of claim 1, wherein the first slot is to be encoded with at least a portion of the request of the first transaction and the second slot is to be encoded with at least a portion of the response of the second transaction.

9. The apparatus of claim 1, wherein the first slot is to be encoded with at least a portion of the request of the first transaction and the second slot is to be encoded with at least a portion of the request of the second transaction.

10. The apparatus of claim 1, wherein one of the plurality of slots comprises snoop information.

11. The apparatus of claim 1, wherein the link layer circuitry is further to generate a second flit comprising a plurality of slots, wherein one or more of the plurality of slots of the second flit are encoded with data associated with a particular transaction; and
    the physical layer circuitry is to transmit the second flit over the link to the other device.

12. The apparatus of claim 11, wherein two or more slots of the plurality of slots of the second flit are to be encoded with the data.

13. The apparatus of claim 1, further comprising a processor.

14. An apparatus comprising:
    a processor;
    a port comprising:
        link layer circuitry to:
            receive a flit over a link, wherein the link comprises a plurality of physical lanes, and the flit comprises:
                a set of informational fields, wherein the set of informational fields comprise fields to identify attributes of the flit;
                a plurality of slots, wherein a first one of the plurality of slots is to be encoded with a request or response of a first transaction, and a second one of the plurality of slots is to be encoded with a request or response of a second transaction; and
                a cyclic redundancy check (CRC) field to be encoded with a CRC value for the flit; and
            verify data integrity of the flit based on the CRC value.

15. The apparatus of claim 14, wherein the set of informational fields comprises an acknowledgment field and a credit return field for the flit.

16. The apparatus of claim 14, wherein the first slot comprises an OpCode field and a field to identify one of a target of the response of the first transaction or a source of the response of the first transaction.

17. The apparatus of claim 14, wherein one of the plurality of slots comprises a header.

18. The apparatus of claim 14, wherein the link layer circuitry decodes the flit to provide information to a higher layer in a protocol stack for the first and second transactions.

19. A method comprising:
    generating a flit to comprise:
        a set of informational fields, wherein the set of informational fields comprise fields to identify attributes of the flit;
        a plurality of slots, wherein a first one of the plurality of slots is to be encoded with a request or response of a first transaction, and a second one of the plurality of slots is to be encoded with a request or response of a second transaction; and
        a cyclic redundancy check (CRC) field to be encoded with a CRC value for the flit; and
    transmitting data blocks corresponding to the flit over a plurality of physical lanes of a link to another device.

20. The method of claim 19, further comprising receiving information for the first and second transactions from a higher layer in a protocol stack.

21. A method comprising:
    receiving a flit from another device over a link, wherein the link comprises a plurality of physical lanes, and the flit comprises:
        a set of informational fields, wherein the set of informational fields comprise fields to identify attributes of the flit;
        a plurality of slots, wherein a first one of the plurality of slots is to be encoded with a request or response of a first transaction, and a second one of the plurality of slots is to be encoded with a request or response of a second transaction; and
        a cyclic redundancy check (CRC) field to be encoded with a CRC value for the flit;
    decoding the flit; and
    providing information for the first and second transactions to a high layer protocol in a protocol stack based on the flit.

22. A system comprising:
    a first device; and
    a second device coupled to the first device by a link, wherein the link comprises a plurality of physical lanes, and the second device comprises:
        a port comprising:
            physical layer circuitry to support a physical layer of the link; and
            link layer circuitry to generate a flit to comprise:

a set of informational fields, wherein the set of informational fields comprise fields to identify attributes of the flit;

a plurality of slots, wherein a first one of the plurality of slots is to be encoded with a request or response of a first transaction, and a second one of the plurality of slots is to be encoded with a request or response of a second transaction; and a cyclic redundancy check (CRC) field to be encoded with a CRC value for the flit, wherein the physical layer circuitry is to transmit data blocks corresponding to the flit over the link to the first device.

23. The system of claim 22, wherein the first device comprises a processor and the second device comprises a memory.

24. The system of claim 22, wherein the first device comprises link layer logic to decode the flit and provide information to a higher layer in a protocol stack.

25. The system of claim 22, wherein the link comprises a physical layer based on a Peripheral Component Interconnect Express (PCIe)-based physical layer.

26. The system of claim 22, wherein the system comprises a system-on-chip (SoC) comprising the first and second devices.

* * * * *